United States Patent Office.

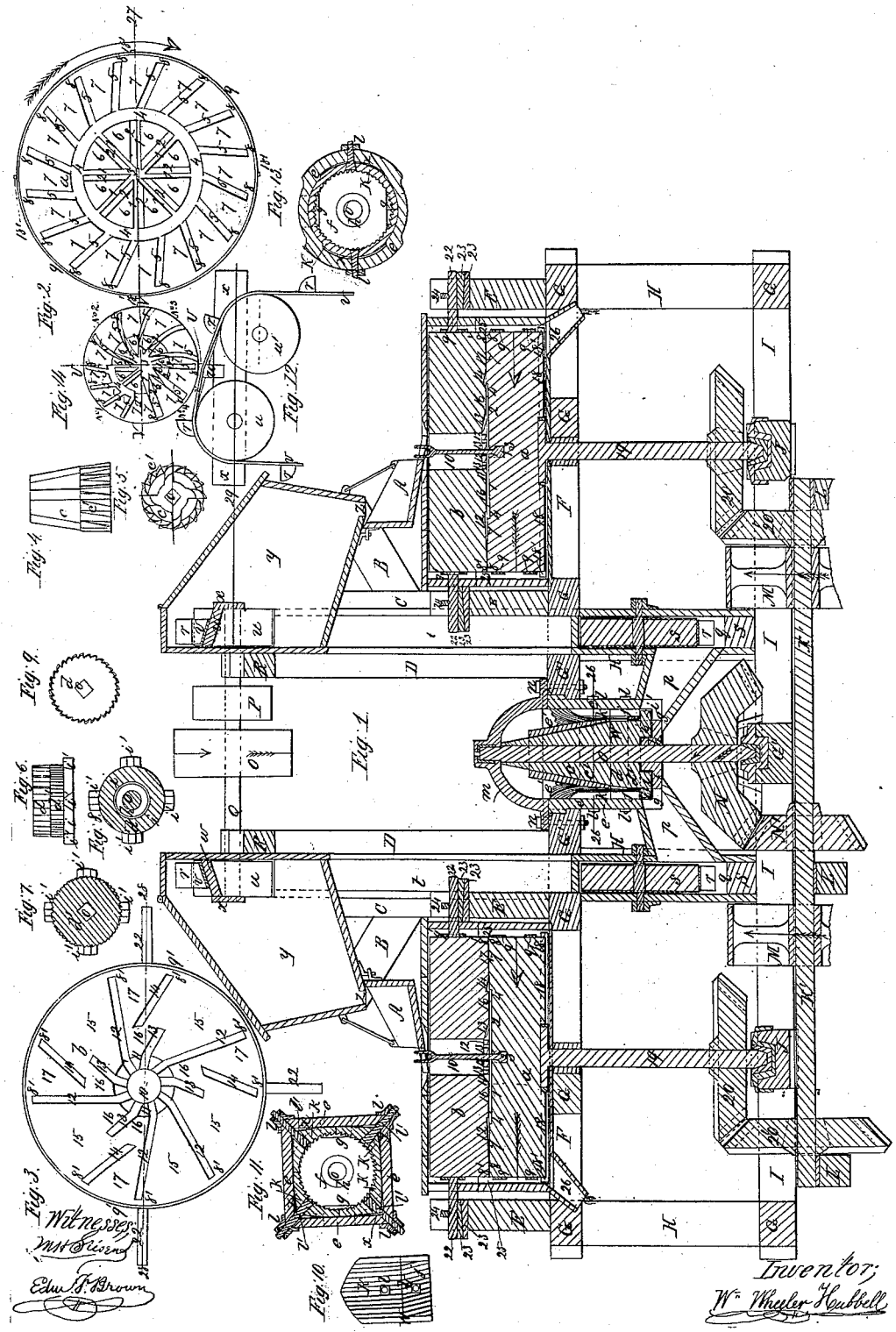

WILLIAM WHEELER HUBBELL, OF PHILADELPHIA, PENNSYLVANIA.

*Letters Patent No. 79,762, dated July 7, 1868.*

IMPROVED QUARTZ-MILL.

*The Schedule referred to in these Letters Patent and making part of the same.*

TO ALL WHOM IT MAY CONCERN:

Be it known that I, WILLIAM WHEELER HUBBELL, of the city of Philadelphia, and State of Pennsylvania, have invented a new and useful Improvement in Gold and Silver-Quartz Mills; and I hereby declare the following to be a full, clear, and exact description thereof, reference being had to the accompanying drawings, being part thereof, and in which the like large letters, like small letters, and like numbers, respectively, refer to similar parts.

Figure 1 represents a longitudinal section, in a vertical plane through the centres, of the pot, stones, and structure of the mill.

Figure 2 shows the upper or furrowed attrition-face of the lower and horizontal revolving stone.

Figure 3 shows the lower or furrowed attrition-face of the upper and horizontal stationary stone.

Figure 4 is a side elevation of the upper section of the central revolving nut, showing the two series of vertical-edged teeth in this section.

Figure 5 is a ground plan of the same section of the nut shown in fig. 4.

Figure 6 is a side elevation of the lower section of the central revolving nut, showing its two series of vertical-edged teeth and series of clearing-arms below them.

Figure 7 is a ground plan of these lower clearing-arms on the periphery of the body of the nut, shown in a horizontal section, cut below the upper series of teeth in fig. 6, and displaying also the lower series of teeth.

Figure 8 is a ground plan in a horizontal section cut below the lower series of teeth in fig. 6, displaying these arms, and also the collar $h$, a part of the bottom of the pot, and the shaft $o$, which extends up through them.

Figure 9 is a ground plan of the upper series of teeth in fig. 6.

Figure 10 is an elevation of the toothed or inside face of one of the four similar sections or plates, in two separate sections and series of teeth, one section and series above the other; in all, eight pieces.

Figure 11 is a ground plan of a horizontal section cut through the pot and its inside plates, on the line 26, fig. 1, with the central nut and shaft removed, showing the bottom of the pot.

Figure 12 is an elevation of upper pulleys and belt, with cups to carry up the cracked or killed quartz from the pot to the receiver, to be fed into the pulverizing-stones.

Figure 13 is a ground plan of a horizontal section, through the inside plates and fastenings, of a rounded form of pot, being a modification of the construction.

Figure 14 is a ground plan (on a half scale) of four forms of furrowing the attrition-face of the stone, one in each of the four quarters of the circle being modifications to effect the same result as in fig. 2.

The nature of my invention consists in constructing the pot, sections, and revolving nuts, so as to adapt them to prepare and supply the hard quartz of gold and silver for two sets of reducing-stones, and to economize the wear and expense of the material in the pot, in its reduction of the quartz by sections and increasing velocities.

Also, in the construction of the apparatus to convey the quartz from the pot and deliver it most advantageously to the pulverizing-stones, all embodied together in and portable with the mill-frame.

Also, in the construction of the furrows of the stones, so as to prepare and expose this quartz most speedily to those portions of the attrition-faces of the stones furthest from their centres, or outside of the middles of their diameters, to most readily, and with economy, pulverize the hard quartz of gold or silver, by the faces of the stones acting on it by horizontal attrition, with a very high velocity.

Referring to the drawings, the construction is as follows:

$e$ is the pot, square-sided, figs. 1 and 11, or rounded, fig. 13. The sides are vertical, or nearly so, as shown. It has a solid bottom, $f$, with two opposite apertures, $g$, in the bottom and sides, as shown, and with a central collar, $h$, rising upward from it, around the central shaft $o$.

$i'$ $i'$ are four arms, bevelled narrower to the top, as shown, to raise up and prevent the quartz from clogging in the chamber in which they revolve, and attached to the periphery of the annular lower part $i$ of the nut's lower section, $d$. The collar $h$ fills a central cavity in this section $d$. In the corners of the pot, cast therewith, are filled shoulders or fillets, shown in dotted lines, fig. 11, forming an annular chamber around the arms $i'$, for them to revolve in, and the tops or shoulders of the fillets forming flat faces for the bottoms of the plates $j$ to set on. $d'$ is the lowest series of teeth of the nut. These teeth are forty-eight in number, and the smallest-sized in the nut.

The nut is on the central shaft $o$, and is cast in two sections, $c$ and $d$, $c$ being above $d$, as shown; and each of these sections has two series of teeth, one above the other; $c$ being on the uppermost series, which has four teeth on a rounded body, enlarging downward; $c'$ being the next section below, with sixteen teeth on a rounded body, also enlarging downward. These teeth have edges with their front faces on vertical planes, and as the teeth diminish in depth downward, they increase in numbers, and diminish in size in the descending series, and also close out closer and closer to the vertical-edged teeth in the plates $k$, which surround them.

In the lower section, $d$, of the nut, the part $d$ has thirty-two teeth on its circular body, with vertical edges, and enlarging in diameter downward, and closer to the plates $j$. In the lower series, $d'$, of the nut, there are the forty-eight teeth, vertical-edged, not enlarging in diameter, where the final reduction of the quartz in the pot takes place, opposite and against the drifted teeth $j$, fig. 10.

The line W, figs. 1 and 10, is the division-joint between the upper and lower sections of the nut, and also of the inside plates, $k$ $j$.

The nuts are removable on the shaft $o$, which runs in a step in the beam $G''$, and a Babbit-metal bearing cast in the removable beam $m$, which surmounts the pot, and secures it down between the cross-beams $G'$ $G'$ by bolts $n$ $n$.

$c'$ $c'$ is the inside vertical face of the pot, against which are bolted the series of sections $k$ and $j$ of the edged-toothed plates, which present a circular face of teeth to the revolving nut, but their backs present angular faces to the angular faces of the pot, with the bearing of the plates made at the surfaces near the joints, and vertical, leaving vertical spaces, $x$, in the angles between the corners of the pot $e$; and the middle of the ribbed or thickened backs of the plates $k$ has a bearing at its sides, and this bearing, at the sides, and not in the centre vertically, prevents the side teeth of the plates from breaking off.

To accomplish this, the corners of the pot are not filleted, but are angular, as shown, and provided with a wrought-iron saddle, $l$, outside, through which, and the pot and plates, the square bevel-headed bolts $l'$ pass from the inside, secured by nuts outside, as shown in fig. 11. These inside plates, $k$ and $j$, are eight in number, made of hard white iron, or chilled on the inner face.

It will be observed that these sections are divided both horizontally and vertically, making four sections in each series, one series above the other series, to line the pot. This is important in this mill, because gold and silver quartz is extremely hard and cutting, and the lower sections, $j$, of the plates, as well as $d$ $d'$ of the nut, wear out much the fastest, and can be renewed without dispensing with the upper sections of the plates and nut.

The form of bevel on the arms $i'$ is useful, as it does not obstruct the descent of the quartz, and tends to raise it up in revolving, to prevent the chamber from being packed by too rapid feeding in.

The bottom, $f$, of the pot holds up the quartz, and the arms measure it out, so that, though the teeth wear off of the nut and plates, the quartz is still retained under a systematic action in the pot, and cannot rapidly and variably run out of it, nor, with these bevelled arms, become packed in it.

The enlarging conduits $p$ $p$ extend, one from each of the opposite apertures $g$ $g$ of the pot, into which these arms equally discharge it. These conduits $p$ $p$ connect with two chambers $q$ $q$, in which are wheels $s$ $s$, with straps $v$ $v$, carrying cups $r$ $r$, which take up the quartz through vertical tubes $t$ $t$, and discharge it into two large hoppers, $y$ $y$, from which it passes through the apertures $z$ $z$, respectively, into the shoes A A, to feed the two opposite sets of pulverizing-stones. These hoppers are supported on framing-timbers B C D.

To work the belts $v$ $v$, a cross-shaft, Q, rests on beams R R, with a pulley, $o$, for power. On this shaft Q is fixed, in each box or hopper, a pulley-wheel, $u$, on the axial line 29, with a cross-piece, $x$, beyond each, to which and the box is attached an inclined piece, $w$, to tilt the cup and strap sideways inwardly, below the wheel $u$. Fig. 12 is another pulley-wheel, $u'$, over which the strap and cups run, and the two tilt out the quartz over the incline $w$, and also give adhesion to raise the heavy quartz. The latter wheel, $u'$, is actuated by the pulley P, and strap running on a pulley on their shaft, not shown, but hung under the beam R, in the relation indicated by the centres of $u$ $u'$ in fig. 12.

The quartz now passes to the pulverizing-stones, from the shoes A, actuated by the spindle 3, as common; and I will now describe the structure of these stones, to enable them to perform the work of pulverizing this kind of quartz.

The stones themselves should be close-grained, hard, and in a single piece, respectively, and four feet in diameter, each. The lower ones each should revolve at least two hundred times a minute. Their success in pulverizing the quartz depends upon first cracking up the coarser particles, and then carrying the fine quartz instantly out from the centre to about the middle of the diameter, and from there outward, subjecting it to the outer attrition-surfaces of the stone, moving with great power and high velocity, or remote from the centre of revolution.

To effect this, the stones are furrowed as follows: The lower or revolving stone, $a$, is cut on radial lines, with furrows, 1-2, about eight in number. 1 is the flat-based or channel part, about three-quarters of an inch wide and five-eighths of an inch deep. 2 is the bevel-face, sloping up to the face 6 of the stone, and is about one inch and an eighth wide. These radial furrows are surrounded by and discharge into an annular furrow or chamber, 4 4 4 4, which is five-eighths of an inch deep and two and a quarter inches wide; and from this annular chamber, on tangential lines, outward to within about one inch inside of the periphery of the stone, are cut about sixteen sloping furrows, 5, about six-tenths of an inch deep on the forward side, and sloping back up to the attrition-face 7 of the stone. 8 is the uncut face beyond their outer end. The faces 6 dish slightly towards the centre of the stone.

In this construction, when the quartz is received on the revolving centre of the stone, it is set also in rotation, and begins to fly from the centre outward along the channels 1, in various sizes, fine and coarse, as reduced by the pot. The coarser particles are caught by the bevel-faces 2, and cracked finer, and they all pass out into the annular chamber 4, which distributes them among the channels or furrows 5, up the inclined sides of which they are drawn on to the faces 7, which are attrition-faces far from the centre of the stone, moving at high velocity under the upper stone $b$.

This upper stone is differently cut. It is dished, 11, around the eye 10, from which radiate nine furrows to the outer edge of the dish. These assist in cracking up the lumps of quartz. These furrows, from the edge of the dish outward, take a tangential direction, 12, 13. The long ones, 12, extend to within about an inch from the periphery of the stone, leaving an uncut face, 8. The short ones, 13, extend outward to about the middle of the diameter, and in the rear of them, respectively, is cut a tangential furrow, 14, leaving an uncut face, 8, beyond. They all bevel up to the attrition-faces, 15, 16, 17, of the stone, and are adapted to the different densities and degrees of fineness of this kind of quartz, subjecting the quartz repeatedly to the greatest practical amount of attrition-surface and under the highest velocity, so that in conjunction with the lower stone, while the quartz is cracked and forced out, it cannot escape except in a thoroughly pulverized condition. It is discharged between the faces of the stones at 25, fig. 1, all around from the periphery within the surrounding case.

9 9' are strong iron bands around the stones.

22 are the usual supporting-arms resting in uprights E, and secured by wedges 23 and keys 24.

The quartz and gold or silver are heavy, and cannot be blown out of the case. To remove them, an aperture, 26, is made in the bottom of the case, and an iron projection, 18, with an extending arm, 18', outside of the periphery of the stone, is secured to the bottom of the stone, so as to sweep around into the outer edge of the case and over the aperture. By this construction the heavy quartz and metal are gathered and brought around over the aperture, and fall out of it into a barrel or reservoir by their great specific gravity, reduced as fine as wheat-flour, and to be amalgamated or otherwise treated to extract the precious metals.

This mill will pulverize about forty tons in twenty-four hours, and as fine as flour.

In fig. 13, the pot is rounded, with recesses, and a space, $x$, back of the middle of the plates, to throw the resistance on the sides, and the plates are in two vertical sections, K K, secured with bolts, $l$. It is a modification of, and in other respects is the same as the square pot and the plates in fig. 11.

The fig. 14 shows modifications of the furrows in the stone, fig. 2, there being four, one in each quarter, and numbered 1, 2, 3, 4, respectively. The lines V V and U U are the divisions.

No. 1 is the same as fig. 2, except at T, where a bridge-piece intercepts the continuity of the annular furrow, and compels the radial furrows to feed the tangential ones, in sets leading into the chamber 4, and stopping the rotary circulation of the quartz, and suited to light quartz.

No. 2 has furrows curved on a circle of the same radius as that of the stone, with the centre set on the line of the periphery. The channel 1 is flat out to the circular line at the middle, with a cracking bevel-face on the rear side 2. Beyond this line is the bevel-face 5 and the attrition-faces 7 to move at high velocity. It is suited to heavy quartz.

No. 3 is the same as No. 2, except that it has no outside uncut faces, 8, and is suited to lighter quartz.

No. 4 are entirely radial furrows, with an outside uncut face, 8. They have the feeding-channel 1, the cracking-face 2, the slope 5, and the attrition-face 7 outside of the middle of the diameter. They are suited only for heavy, hard quartz, which tends to drag or stick, and requires great centrifugal action to throw it out through the stones, and they are also suited to work tailings which have been damp.

The framing and gearing of the mill are important. The two sets of stones run in the same direction and are interchangeable. The pot and stones are operated from the one shaft, K', by the construction and arrangement of the intermediate appliances, so that the whole process of reduction, with greatly increased result in quantity from one pot, is carried on at one operation.

The pulley $o$, to feed the stones, is operated by a belt from the main power. The arrows indicate the directions of motion throughout.

The framing of the mill has two bottom sills, I, resting on masonry, with a pit, two cross-sills, G, and a centre-beam, G''. Below are bolted three cross-pieces, L, which carry the shaft K', main pulleys M M, and pinions 20' and N'. The two, 20', gear into the pinions 20 20, and run the lower stones. The latter, N', gears into the pinion N, and runs the nut of the pot, all in the same direction of rotation.

S S are cross-pieces supporting the elevating-boxes $q\ q$ and apparatus.

H are vertical uprights on the sill-pieces, four each side, supporting the upper beams F with six cross-pieces, G, and two cross-pieces G'. Between the latter the pot is held. The vertical shafts 19 of the stones rest in steps on adjustable beams J, and are clasped by a box attached to the middle beam G under each stone.

This manner of furrowing stones to reduce this quartz is not applicable to iron or metal. The furrows may be used separately or together, as described.

The lines 27, 28, figs. 2 and 3, are the cuts on which the sections of the stones $a\ b$ in fig. 1 are shown.

I do not here mean to claim any of the improvements mentioned in the patent allowed Hubbell and Patton for quartz-crushers. This operates differently.

The central revolving nuts inside of the pot, instead of being formed circular, or with the teeth concentric with the axis of the vertical shaft, may be, and I have contemplated having them, or some of them, particularly the second series of teeth from the top and the second series from the bottom, being one or both of the middlemost series, made elliptical in form, or when made circular to be fixed or set eccentric on the shaft, so as in either case to have some of the teeth gradually approaching the fixed teeth in the pot, as the former revolve, and presenting, by such elliptical or eccentric form, necessarily or resultantly, a sufficient space for the descent of the quartz to or in front of them, opposite those teeth which curve away from the stationary teeth of the pot, and thus the teeth of the nut are made to close upon the quartz by the horizontal rotation or movement of the nut. The nuts, also, may be made of the same diameter vertically in the different series or of the same or different elliptical size.

What I here claim as my invention, and desire to secure by Letters Patent, is—

1. The opposite apertures $g\ g$ and revolving arms $i'$, operating in the lower part of the pot $e$, containing the nuts $c\ c'$, $d\ d'$, and plates $k\ j$, in combination with the two sets of stones $a\ a$, $b\ b$, and the opposite inclined conduits $p\ p$, elevators $s\ s$, $v\ v$, $r\ r$, hoppers $y\ y$, all constructed and arranged one with the other, as and for the purpose set forth.

2. The combination of the grinding-plates $k\ j$ with concave interiors and angular exteriors, ribbed or thickened backs, and the pot $e$, when so secured together by means of the saddles $l$ and bolts $l'$ as to leave the angular spaces $x$, substantially as herein described.

WM. WHEELER HUBBELL.

Witnesses:
   M. H. STEVENS,
   EDM. F. BROWN.